United States Patent [19]

Koenig

[11] 4,326,424
[45] Apr. 27, 1982

[54] WEB TENSION TRANSDUCER ARRANGEMENT

[75] Inventor: Robert G. Koenig, Hudson, Ohio

[73] Assignee: Cleveland Machine Controls, Inc., Cleveland, Ohio

[21] Appl. No.: 118,807

[22] Filed: Feb. 25, 1980

[51] Int. Cl.³ .................................................. G01L 5/10
[52] U.S. Cl. ............................... 73/862.48; 73/862.65
[58] Field of Search ................ 73/144, 862.48, 862.55, 73/862.65

[56] References Cited

U.S. PATENT DOCUMENTS

| | | | |
|---|---|---|---|
| 3,439,761 | 4/1969 | Laimins | 73/141 A |
| 3,763,701 | 10/1973 | Wright et al. | 73/144 |
| 3,927,560 | 12/1975 | Farr | 73/141 A |
| 4,052,891 | 10/1977 | Bartlett | 73/144 |
| 4,130,014 | 12/1978 | Eddens | 73/144 X |

FOREIGN PATENT DOCUMENTS 1263182  2/1972  United Kingdom .
1498987  1/1978  United Kingdom .

*Primary Examiner*—Charles A. Ruehl
*Attorney, Agent, or Firm*—Meyer, Tilberry & Body

[57] ABSTRACT

A web tension transducer device which is easily installed, has a high natural frequency, excellent linearity, and extremely low hysteresis. A twin beam type transducer having strain gages at the flex points of the beams is coupled to the shaft supporting the moving web through a self-aligning anti-friction bearing, the strain gages being so located and electrically connected that effects of friction in the bearing due to bending of the shaft are automatically cancelled out in the circuitry in which the strain gages are connected. The self-aligning bearing coupling is arranged to permit relative axial displacement between the shaft and the twin beam transducer for accommodating comparatively large amounts of shaft expansion. The bearing also may have a bearing surface liner comprised of a low coefficient of friction thermoplastic resin material such as teflon fiber or teflon fiber-filled acetal resin fabric.

14 Claims, 10 Drawing Figures

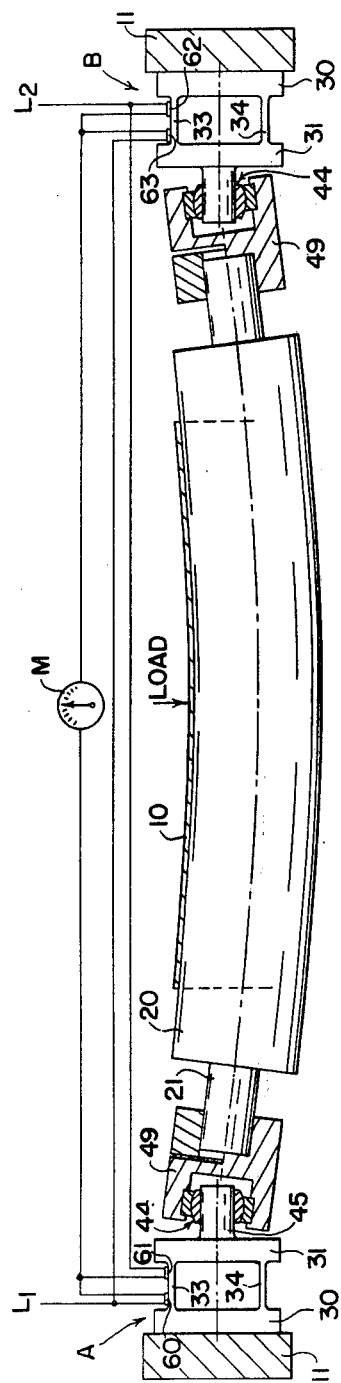
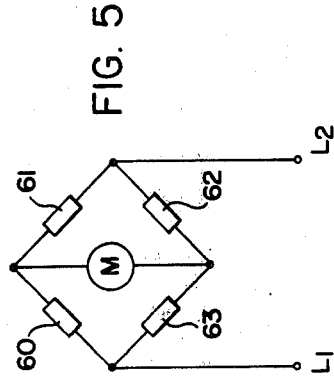
FIG. 4
FIG. 5

WEB TENSION TRANSDUCER ARRANGEMENT

This invention relates to the art of web tension sensing devices and more particularly to a device for sensing the tension in rapidly moving webs and producing a signal proportional to such tension. The present application is a continuation-in-part of application Ser. No. 25,446, filed Mar. 30, 1979, now abandoned.

PRIOR ART

This invention in many ways relates to improvements in the devices described in U.S. Pat. No. 3,260,106, issued July 12, 1966, and owned by the assignee of this application; U.S. Pat. No. 3,763,701 issued Oct. 9, 1973; U.S. Pat. No. 4,052,891 issued Oct. 11, 1977; and the disclosures of such patents are incorporated herein by reference.

BACKGROUND

In those patents, a web of flexible material such as a fabric, paper or metal, passes partly around a roller rotatably supported on an axle, the ends of which axle are in turn supported by a device capable of measuring the transverse or radial forces exerted on the roller by the tensions in the web. In each of these patents, the device consists generally of a single, metal, flexible beam or arm integral with and cantilevered at one end on a base plate mounted on a side frame of the apparatus and at the other end supporting a face plate which in turn is operatively associated with an end of the roller axle through a hinged or jointed connection which enables the extended line of the end of the beam or arm to diverge slightly from the axis of the roller as the beam or arm bends under the forces imposed thereon by the axle. In each of these patents, one or more strain gages of conventional construction are permanently fastened to the sides of the beam or arm generally close to the point where the beam or arm is cantilevered from its base plate. Such flexure of the beam or arm under forces imposed by the moving web stresses the gages and alters their internal resistance. Apparatus is then provided for measuring the changes in the resistance of the strain gages due to the stress variations therein, and either visually indicating the changes or actuating other servo-mechanisms for maintaining the web tension constant. Such apparatus normally includes electronic amplifying means of varying degrees of amplification.

Such devices are quite sensitive to small force variations, so much so, in fact, that the response curve has an undesirable hysteresis loop therein. Analysis showed that it was caused by the friction in the hinged or jointed connection between the axle and the movable face plate. Thus, as tension on the web increases, the beam bends, resulting in its extended axis diverging relative to the roller axis, which divergence is taken up by the hinged connection. Undesirable friction in this connection produces a force couple which, as web tension increases, acts to resist the bending of the beam and therefore causes a reduction in the stress applied to the strain gage and the resultant tension signal. As tension in the web decreases and the beam is unloaded, the friction couple in the hinged connection produces a force couple which acts in the opposite direction and causes an increase in the resultant tension signal. The difference in these signals results in a hysteresis loop in the response curve which makes the sensor unsatisfactory for extremely critical applications.

Subsequently, a sensor was introduced comprised of a pair of parallel spaced arms or beams each integrally connected at one end to the base plate and at the other end to the face plate which face plate then was connected to the axle of the web roller.

As this twin beam sensor was loaded, the extended axis from the face plate remained parallel to the unloaded axis and no force couple was introduced due to the bending of the beams. Accordingly, it was found possible to eliminate the expensive bearing connection and a rigid connection between the shaft and the sensor was employed.

Such devices were an improvement, even though, in some instances, a hysteresis loop remained. As a result of observations which lead to the development of the present invention it was found that, particularly when the web roller had a substantial length, the axle of the roller was bent or deflected throughout its length by the web tension forces such that its extended axis was no longer parallel to the extended axis of the face plate. This placed one of the beams in longitudinal tension and the other in longitudinal compression which forces affected the strain gages in the same manner as bending forces and gave inaccurate results and hysteresis in the response curve. Further, the arrangement had difficulty accommodating these misalignments of the shaft and/or expansions or contractions thereof.

A further problem which is common to prior web tension transducers employing a flexible diaphragm for coupling the shaft to the supporting face plate is the likelihood of damage or failure to the flexible diaphragm due either to fatigue caused by repetitive overloading of the transducer or vibration of the roller shafts, or to repeated shaft expansion such as results when the roller shaft is heated. Also, prior web tension transducers which have employed a ball bearing pivot for the hinged or jointed connection between the shaft and the movable face plate have experienced the additional problem of having a very limited ability to accommodate shaft expansion.

A further problem which has come to attention since the filing of the parent application is a fretting type corrosion in an articulated joint such as employed in the preferred embodiment of the invention, which corrosion resulted in inaccuracies of measurement. As is well known, in web tension measuring devices the radial forces on the web rollers are very high. In the web tension sensor according to the invention, these forces are transmitted to the sensor through an articulated joint made of metal. In operation, the angular variation in this joint, particularly those produced by vibration, is substantially less than 1°. Analysis showed that the lubrication film between the metal surfaces broke down under the high unit pressures caused by the radial forces on the roller, resulting in a metal-to-metal contact. The very small angular movement in the joint caused a molecular bonding of the metals forming the joint which resulted in what appears to be a fretting corrosion or galling of the bearing surfaces as the angular movement continued. This fretting corrosion of the bearing surfaces then caused the aforementioned inaccuracies of measurement.

THE INVENTION

The present arrangement contemplates a new and improved sensor arrangement which overcomes the difficulties of the prior art and provides a web tension sensor which has practically no hysteresis loop in its response curve, reduced deflection, a high resonance frequency, and a greater ability to accommodate any shaft expansion and/or roller misalignment without damage to the sensor.

In accordance with the present invention, a strain sensor for the roller in a web tension machine is provided comprised of a twin beam type transducer having a base plate adapted to be mounted on the frame of the web handling apparatus and a movable plate supporting the axle of the web roller through a self-aligning bearing, the twin beam transducer having strain gages positioned on the same side of but at opposite ends of one of the beams, such strain gages being connected in an electrical circuit such that resistance variations produced by longitudinal tension or longitudinal compression forces in the beam produced by friction in the self-aligning bearing are automatically cancelled out and only bending forces on the beams produce a usable signal.

In accordance with a further aspect of the invention, the outer race member of the self-aligning or spherical bearing of the web tension measuring device is provided with a bearing surface liner of a suitable low coefficient of friction thermoplastic material to prevent fretting corrosion or galling of the bearing surface due to vibration forces and high pressure imposed on the bearing.

OBJECTS

The principal object of the invention is the provision of a new and improved strain sensor arrangement for web tension machines which overcomes the problems of the prior art, has a minimum or no hysteresis response loop, and which is accurate and dependable in operation.

Another object of the invention is the provision of a new and improved web tension sensor arrangement for web handling machines wherein a dual beam sensor is provided in combination with a self-aligning bearing connection between the sensor and the axle of the web tension roller, the strain sensing gages of the sensor being so arranged and electrically connected that the effect of friction forces in the self-aligning bearing are automatically cancelled out and do not affect the accuracy of the sensor.

Another object of the invention is the provision of a new and improved device of the type described which has a higher resonant frequency.

Still another object of the invention is the provision of a new and improved device of the type described which has a greater ability to accommodate roller shaft expansion.

A further object of the invention is the provision of a new and improved device of the type described which can accommodate greater amounts of roller misalignment than heretofore.

Still a further object of the invention is the provision of a new and improved device of the type described which effectively cancels the effects of torque due to friction in the self-aligning bearing which supports the roller shaft of the device.

Another object of the invention is the provision of a new and improved device of the type described which is insensitive to the effects of bending of the roller supporting shaft due to tension forces on the web.

Still another object of the invention is the provision of a new and improved device of the type described which is not subject to failure by fatigue caused by overloading or vibration and other forces to which the device is subjected in use.

A further object of the invention is the provision of a new and improved device of the type described having a self-aligning bearing with bearing surfaces which are free from the development of fretting corrosion or galling thereof by vibration and other forces to which the device is subjected during operation.

DRAWINGS

The invention may take physical form in certain parts and arrangements of parts, a preferred embodiment of which will be described in detail in this specification and illustrated in the accompanying drawing which forms a part hereof and wherein;

FIG. 4 is a fragmentary schematic view of the entire web supporting roller supported at its end by sensors and showing how the web supporting roll bends under transverse forces imposed thereon;

FIG. 5 is a schematic wiring drawing showing how the strain gages of FIG. 4 are electrically connected;

PREFERRED EMBODIMENT

Figure 1:
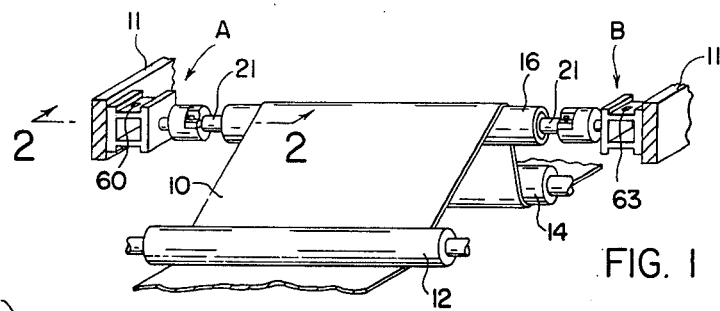
FIG. 1 is a fragmentary perspective view of the general arrangement of a system by which the tension in a moving web is monitored.

Referring now to the drawings, wherein the showings are for purposes of illustrating a preferred embodiment of the invention only and not for the purposes of limiting same, FIG. 1 shows a web 10 continuously moving through a web handling apparatus comprised of a frame 11, a pair of spaced parallel guide rollers 12, 14 extending horizontally, for example, and a parallel web tension measuring roller 16 displaced from, e.g., above, the line between rollers 12, 14 by an amount such that the web 10 as it moves is displaced from its line of movement and is wrapped partly around the roller 16. The tension on the web thus exerts a force downwardly against the roller 16 somewhere between the two rollers 12 and 14, the direction of which force depends upon the angle subtended by the web as it passes over the roller 16. The web handling apparatus is conventional and is shown schematically with only those parts thereof pertinent to the present invention being shown.

The roller 16 is rotatably supported by means of roller bearings 20 on a fixed shaft or axle 21 likewise disposed parallel to rollers 12, 14, e.g., horizontally, which shaft extends transversely between the side frames 11 of the apparatus, and the ends of this shaft 21 are supported relative to the frame 11 by means of a pair of identical force-sensing means A, B, in a manner in accordance with the present invention.

Figure 3:
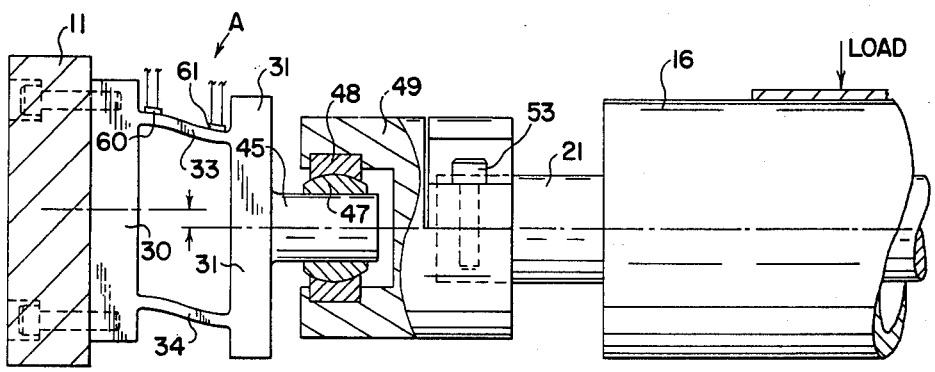
FIG. 3 is a view similar to FIG. 2 but somewhat schematic showing the sensor under load.

In the embodiment shown, each force-sensing means comprises a sensor beam member having base and movable plates 30, 31, normally formed of metal and held in spaced parallel relationship transversely of the shaft 21 by a pair of spaced parallel arms 33, 34 which, as shown, may be of comparatively thin plate-shaped form and disposed flatwise of and parallel to and laterally spaced apart, e.g., vertically spaced, on opposite sides of and preferably equidistant from the axis of shaft 21 in the unloaded condition thereof. These arms 33, 34 are fastened at their respective ends to the plates 30, 31 by any suitable means such as by welding, or integral as shown. The plate 30 is rigidly fastened to the base 36 of a cup-shaped housing 37 which housing in turn is mounted on the frame 11 of the apparatus by means of threaded bolts 38 extending through openings in the frame 11 and a flange 39 on the housing. The arms 33, 34 form twin beams which bend or deflect relative to both plates 30, 31 when forces are imposed on the plate 31 by forces on the shaft 21 due to the tension in the web 10. As the force increases, the upper surface of the left end and the lower surface of the right end of each beam 33, 34, as viewed in FIG. 3, are in a state of increasing tension while the opposite surfaces are in a state of increasing compression.

Figure 2:
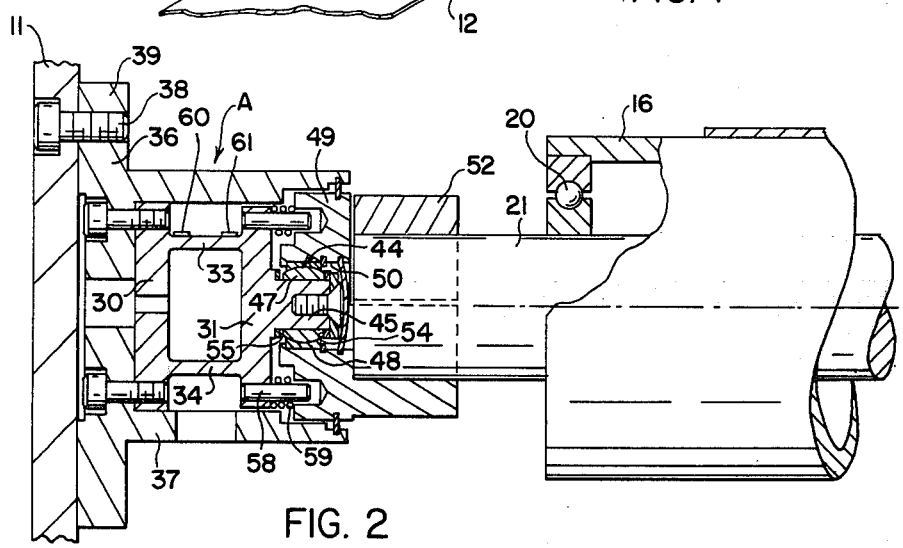
FIG. 2 is an enlarged fragmentary view of FIG. 1 taken approximately on the line 2—2 thereof showing in detail a preferred embodiment of a twin beam sensor in its normal state with no forces imposed thereon.

In accordance with the invention, the plate 31 is operatively associated with the end of the shaft 21 so as to support same in a manner whereby slight misalignment of the shaft with the plate 31 can occur without adversely affecting the operation of the apparatus. In the embodiment shown, the plate 31 of sensor A has a cylindrical boss or stub shaft 45 extending to the right as viewed in FIG. 2 with a self-aligning or so-called spherical bearing 44 supported thereon. As shown, the boss 45 is centered between the two arms or beams 33, 34 with its axis coincident with the axis of shaft 21 in the unloaded condition thereof. The bearing 44 is comprised of an inner truncated spherical or ball member 47 either fixedly or slidably mounted on the boss 45 and centered on its axis, and an outer race 48 having an inner spherical surface movably supported on the spherical surface of the ball member 47. This outer race 48 is in turn either slidably or, as shown, fixedly mounted in a coupling 49 which may be of cylindrical form having on one end a bore 50 to receive the bearing 44 and on the opposite end, a semi-cylindrical opening to receive the end of the shaft 21. A clamping member such as a saddle block 52 clamped by screws 53 rigidly fastens the shaft 21 to this coupling and thus to the self-aligning bearing 44. With this arrangement preferably having the spherical bearing member 47 slidable to a slight extent on the boss 45 as permitted by the small clearance as shown between wave spring washers 54, 55 on the boss, and with the outer race 48 fixedly mounted in coupling 49, it will be appreciated that the shaft 21 can expand or contract slightly in length due to temperature changes or otherwise, which changes in dimension will be taken up by the spherical member 47 sliding axially on the boss 45. In a similar manner, the axis of the shaft 21 can diverge slightly from the axis of the boss 45 without appreciable forces being exerted on the plate 31 except for the friction of the bearing itself which as will appear has no effect on the electrical signal produced by the sensing device. This divergence can result from misalignment of the axis on the original installation or due to the shaft 21 bending under the lateral forces imparted thereto by the web tension as shown in FIG. 4.

Roll or dowel pins 58 are mounted on plate 31 and extend axially into somewhat larger openings in the opposed surface of coupling 49 which pins act as stops to prevent the coupling 49 from rotating relative to plate 31 due to friction in bearings 20. A compression coil spring 59 is positioned around each pin 58, and compressed between the plate 31 and the coupling 49 to remove any free play in the bearing mounting.

In the embodiment shown, the arms 33, 34 both form means for supporting the plate 31 relative to the plate 30, and at the same time resilient or flexurable means allowing the plate 31 to move parallel relative to the plate 30 and transversely to the axis of the boss 45 and shaft 21 due to forces imposed on the roller 16 due to tensions in the web 10. As shown in FIG. 3, the web imposes a vertical force downwardly in the plane of the drawing (i.e., in the plane defined by the arms 33, 34), which force is applied to the plate 31 through the self-aligning bearing 44 and this force causes the arms 33, 34 to bend as beams generally as is shown in exaggerated form in FIG. 3. Because the arms 33, 34 are widely spaced relative to their length, the plate 31 as it moves in a direction transversely to the axis of boss 45, e.g., downwardly, is held in parallel relationship with the fixed base plate 30.

The forces on the sensor are such as never to exceed the elastic limit of the metal in the arms 33, 34 so that they always function as a perfect spring and plate 31 will always move in exact linear relationship to the forces applied thereto.

As shown in FIG. 3, the twin beam support of the plate 31 is such that the axis of the boss 45 while moving downwardly under the web tension forces, does not rotate. The axis of boss 45 in the beam stressed and unstressed positions is always parallel. This becomes particularly of importance when it is realized that the shaft 21 on which the roller 16 is rotatably supported will bend under the web tension forces in the manner as is generally shown in FIG. 4. Thus, due to the bending of this shaft, the extended axis of the shaft 21 will no longer be parallel with the axis of the boss 45. This bending of the shaft creates, through the friction of the bearing 44, a force couple on the boss 45 which would normally tend to rotate the plate 31. Because the plate 31 is firmly supported at two spaced points, this force couple cannot cause rotation of the plate. However, the force couple does place arm 33 in longitudinal tension and the other arm 34 in longitudinal compression (or vice versa) as the force couple increases (or decreases) with variations in the web tension.

In FIG. 3 the upper left and lower right surfaces of arms 33, 34 are in a state of bending tension while the lower left and upper right surfaces are in a state of bending compression.

To measure these tensions, strain gages 60, 61 are mounted on the upper surface of arm 33, one adjacent each end thereof, this being the point of maximum flexure of the arm 33 due to forces exerted thereon by the moving web 10. Thus, as viewed in FIG. 3, strain gage 60 is in a state of bending tension while strain gage 61 is in a state of bending compression. The resistance of these gages always varies in opposite directions. The same would be true in the sensing means B where strain gages 62, 63 are similarly mounted.

The four strain gages are connected in a bridge circuit as is shown in FIG. 5 in such a manner that as the resistances of strain gages 60, 62 increase under bending stress and the resistances of strain gages 61, 63 decrease under bending stress, an indication will be given on meter M connected between two opposed points of the bridge. This bridge circuit is energized at the diagonally opposite points from a suitable AC or DC power source through wires L1, L2. Obviously, electrical amplifying means (not shown) may be substituted for meter M which means can control servo motors or the like for adjusting the web tension.

The four strain gages are also affected by the longitudinal tension and/or longitudinal compression forces in the arms 33 caused by the friction force couple on plate 31 the same as they would be affected by flexure of the arm 33, except that the resistances of the two gages always vary in the same direction. Because the strain gages 60, 61 and 62, 63, respectively, are on opposite sides of the bridge circuit, variations caused by longitudinal tension (or compression) forces due to this force couple are automatically cancelled out and thus have no effect on the output signal of the bridge.

Figure 6A:
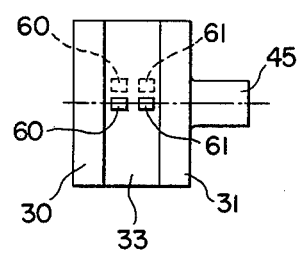
FIGS. 6a and 6b are top plan views.
Figure 6B:
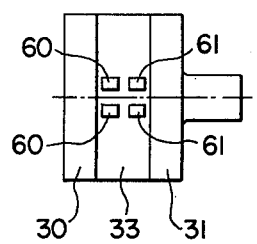
Figure 6C:
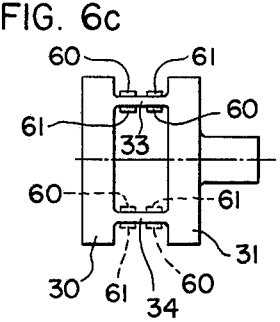
FIGS. 6c and 6d are side elevation views, of the twin beam sensor member and illustrating the various locations at which the strain gages may be placed thereon; and, FIG. 7 is a fragmentary sectional view illustrating a modified form of the self-aligning bearing employed in the device according to the invention.

The strain gages may be located on or off the longitudinal center line of the arm 33 as desired and as shown in solid and dotted lines, respectively, in FIG. 6a. Alternatively, strain gages may be placed on both sides of the longitudinal center line of the arm 33 (FIG. 6b) or may be positioned in a similar manner, (i.e., centered or offset, on both the arm 33 and the arm 34 or on both sides of one or both arms 33, 34 as shown in FIG. 6c. In any event, as long as the strain gages are suitably connected in a bridge circuit, the effect of longitudinal tension or compression due to the bearing friction force couple is cancelled out and accurate measurements of the tensions of the web 10 on the roller 16 can readily be obtained and either can be converted into a visual signal or a signal which can be used to further actuate conventional equipment to control the tension in the web 10.

Figure 6D:
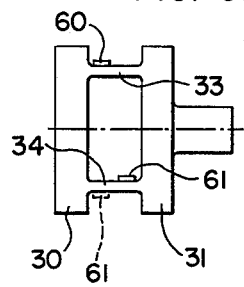

If desired, one gage may be located on arm 33 and one gage located on arm 34 (FIG. 6d), one being in tension and the other being in compression. However, while the gages located in these locations will show an improved performance over a single beam type sensor, they are not as effective as gages located on the same beam of a twin beam sensor in reducing hysteresis. In this configuration, the reduction in hysteresis is obtained because of an increased moment arm from the center of the beam assembly to the beams.

Figure 7:
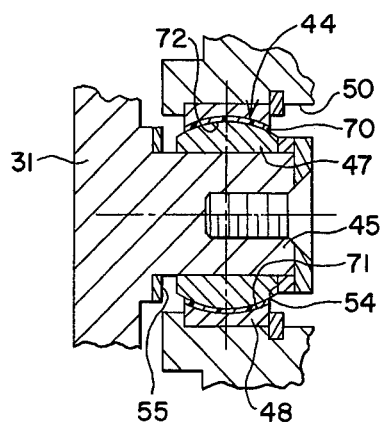

In the modification shown in FIG. 7, the outer race 48 of the spherical self-aligning bearing 44 is provided with a liner 70 suitably bonded to its spherical face 71 to form a correspondingly contoured spherical bearing surface 72 for the spherical inner or ball member 47 of the self-aligning bearing. The liner 70 is constituted of a suitable low coefficient of friction thermoplastic material comprised, for example, of teflon fiber or a teflon fiber-filled acetal resin fabric. The provision of such a thermoplastic liner 70 on the outer race 48 to form the bearing surface 72 thereof acts to prevent fretting corrosion or galling of the bearing surfaces on the ball member 47 and outer race 48 such as would be likely to develop as a result of the vibration and high pressure to which the bearing 44 is normally subjected in use and which would then cause erroneous tension-indicating output signals from the device such as would necessitate the replacement of the bearing 44 and consequent interruption of the operation of the tension measuring device.

It will thus be seen that a web tension sensing arrangement is provided wherein the mechanical advantages of a self-aligning bearing support between the roller support shaft and the transducer are retained without the concomitant adverse effects of friction in the bearing causing an undesirable hysteresis in the electrical response curve. In this connection, the hysteresis in prior art web tension measuring devices employing a single flexure beam with a self-aligning bearing has been excessive, typically being greater than 2% which level is unacceptable for most web tension measurement applications. In contrast, the hysteresis in a twin beam type of web tension measuring device such as that comprising the invention, employing a self-aligning bearing, is typically less than ½% which level of hysteresis is acceptable for even extremely critical web tension measuring applications.

The invention has been described in connection with a preferred embodiment. Obviously, modifications and alterations will occur to others upon a reading and understanding of this specification and it is my intention to include such modifications and alterations insofar as they come within the scope of the appended claims.

Having described my invention, I claim:

1. In a web tension measuring device for apparatus having a frame and adapted to handle a continuously moving web which passes partly around a transversely extending roller supported at least on one of its ends by said device, said device including a pair of spaced plates, one being fixed and adapted to be supported by the frame of said apparatus, and the other being movable and having roller support means adapted to support an end of said roller, a pair of spaced arms rigidly fastened at their ends to said plates with the plane defined by said arms being generally parallel to the plane of the transverse web forces on said roller, the improvement which comprises a pair of strain gages mounted on said arms in positions where one will be compressed and the other tensioned by forces parallel to said plane, said roller support means including a self-aligning spherical bearing and said strain gages being so electrically connected that resistance changes therein caused by longitudinal tension (or compression) forces in said arms caused by friction in said bearing cancel each other out, said roller support means comprising a boss on said movable plate and said self-aligning bearing including a member mounted on said boss and a second member operatively associated with the end of said roller.

2. The improvement of claim 1 wherein the said self-aligning bearing includes a truncated spherical inner ball member mounted on said boss and an outer race member operatively associated with the said one end of said roller.

3. In a web tension measuring device as specified in claim 1 wherein the said roller support means includes a coupling and the said roller of said apparatus is rotatably mounted on a fixed shaft supported at least on one of its ends by the said coupling, and wherein the said self-aligning spherical bearing includes a truncated spherical inner ball member mounted on said boss and an outer race member having a spherical bearing surface and mounted on said coupling.

4. In a web tension measuring device for apparatus having a frame and adapted to handle a continuously moving web which passes partly around a transversely extending roller supported at least on one of its ends by said device, said device including a pair of spaced plate members, one being fixed and adapted to be supported by the frame of said apparatus, and the other being movable and having roller support means adapted to support an end of said roller, a pair of spaced arms rigidly fastened at their ends to said plates with the plane defined by said arms being generally parallel to the plane of the transverse web forces on said roller, the improvement which comprises a pair of strain gages mounted on said arms in positions where one will be compressed and the other tensioned by forces parallel to said plane, said roller support means including a self-aligning spherical bearing and said strain gages being so electrically connected that resistance changes therein caused by longitudinal tension (or compression) forces in said arms caused by friction in said bearing cancel each other out, said roller support means comprising a boss on said movable plate and said self-aligning bearing including a member mounted on said boss and a second member operatively associated with the end of said roller, and interengageable means on said movable plate and said second member for preventing relative rotation therebetween about said bearing.

5. The improvement of claim 4 wherein said interengageable means for preventing relative rotation between said movable plate and said second member includes a stop mounted on one of said movable plate and said second member and loosely engaging the other one thereof.

6. In a web tension measuring device for apparatus having a frame and adapted to handle a continuously moving web which passes partly around a transversely extending roller rotatably mounted on a fixed shaft supported at least on one of its ends by said device, said device including a pair of spaced plate members, one being fixed and adapted to be supported by the frame of said apparatus, and the other being movable and having roller support means including a coupling supporting the said one end of said shaft, a pair of spaced arms rigidly fastened at their ends to said plates with the plane defined by said arms being generally parallel to the plane of the transverse web forces on said roller, the improvement comprising said roller support means comprising a boss on said movable plate and said self-aligning bearing including a truncated spherical inner ball member mounted on said boss and an outer race member mounted on said coupling and having a spherical bearing surface, said inner ball member being slidable on said boss to a slight extent between limited clearance stop shoulder means thereon, and spring means compressed between said movable plate and said coupling to remove free play between said inner ball member and said stop shoulder means.

7. The improvement of claim 6 including a plurality of roll pin stop means mounted on said movable plate and loosely engaging said coupling within recesses therein, said spring means comprising a compression coil spring on each of said roll pins.

8. In a web tension measuring device for apparatus having a frame and adapted to handle a continuously moving web which passes partly around a transversely extending roller supported at least on one of its ends by said device, said device including a pair of spaced plates, one being fixed and adapted to be supported by the frame of said apparatus, and the other being movable and having roller support means adapted to support an end of said roller, a pair of spaced arms rigidly fastened at their ends to said plates with the plane defined by said arms being generally parallel to the plane of the transverse web forces on said roller, the improvement which comprises a pair of strain gages mounted on said arms in positions where one will be compressed and the other tensioned by forces parallel to said plane, said roller support means including a self-aligning spherical bearing and said strain gages being so electrically connected that resistance changes therein caused by longitudinal tension (or compression) forces in said arms caused by friction in said bearing cancel each other out, said self-aligning bearing including an outer race member having a bearing surface liner comprised of a low coefficient of friction non-fretting and non-galling thermoplastic resin material.

9. The improvement of claim 8 wherein said thermoplastic resin material is selected from the group consisting of teflon fiber and teflon fiber-filled acetal resin fabric.

10. In a web tension measuring device for apparatus having a frame and adapted to handle a continuously moving web which passes partly around a transversely extending roller supported at least on one of its ends by said device, said device including a pair of spaced plates, one being fixed and adapted to be supported by the frame of said apparatus, and the other being movable and having roller support means adapted to support an end of said roller, a pair of spaced arms rigidly fastened at their ends to said plates with the plane defined by said arms being generally parallel to the plane of the transverse web forces on said roller, the improvement which comprises a pair of strain gages mounted on said arms in positions where one will be compressed and the other tensioned by forces parallel to said plane, said roller support means including a self-aligning spherical bearing and said strain gages being so electrically connected that resistance changes therein caused by longitudinal tension (or compression) forces in said arms caused by friction in said bearing cancel each other out, said roller support means comprising a boss on said movable plate and said self-aligning bearing including a member mounted on said boss and an outer race member operatively associated with the end of said roller and having a bearing surface liner comprised of a low coefficient of friction non-fretting and non-galling thermoplastic resin material.

11. The improvement of claim 10 wherein said thermoplastic resin material is selected from the group consisting of teflon fiber and teflon fiber-filled acetal resin fabric.

12. The improvement of claim 10 wherein the said self-aligning bearing comprises a truncated spherical inner ball member mounted on said boss and having a spherical outer bearing surface and wherein the said thermoplastic resin bearing surface liner on said outer race member is provided with a spherical bearing surface matching and in surface engagement with the said spherical bearing surface of said ball member.

13. The improvement of claim 12 wherein said roller is rotatably mounted on a fixed shaft supported on one of its ends by said device and said roller support means includes a coupling supporting the said one end of said shaft, said outer race member being mounted on and supporting said coupling on said inner ball member.

14. In a transducer device for connecting one end of a shaft having a central axis to a support frame, including first support means for fixing the transducer to said frame and movable support means for supporting said one end of said shaft, flexure beam means extending longitudinally of said shaft axis and interconnecting said first support means and said movable support means, strain gauge means mounted on said beam means for creating a signal indicative of flexure of said beam means, and coupling means between said shaft end and said movable support means and including one element mounted on and movable with said shaft end and another element mounted on said movable support means and slidably engaging said one element, the improvement comprising: bearing means between said slidably engaged elements and comprised of a thin compressive load-bearing layer of a low coefficient of friction, non-fretting and non-galling thermoplastic resin material.

* * * * *